(12) United States Patent
Shiraga et al.

(10) Patent No.: US 11,748,042 B2
(45) Date of Patent: Sep. 5, 2023

(54) COMPUTER-READABLE MEDIUM, REGISTRATION DEVICE, REGISTRATION SYSTEM, AND METHOD TO REDUCE WORKLOAD TO REGISTER A PLURALITY OF DEVICES

(71) Applicant: BROTHER KOGYO KABUSHIKI KAISHA, Nagoya (JP)

(72) Inventors: Naoto Shiraga, Nagoya (JP); Kenji Tamaki, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/705,851

(22) Filed: Mar. 28, 2022

(65) Prior Publication Data
US 2022/0317947 A1 Oct. 6, 2022

(30) Foreign Application Priority Data
Mar. 31, 2021 (JP) .................................. 2021-059363

(51) Int. Cl.
*G06F 3/12* (2006.01)
(52) U.S. Cl.
CPC .......... *G06F 3/1218* (2013.01); *G06F 3/1238* (2013.01)
(58) Field of Classification Search
CPC .............................. G06F 3/1218; G06F 3/1238

USPC ......................................................... 358/1.14
See application file for complete search history.

(56) References Cited

U.S. PATENT DOCUMENTS

| | | | |
|---|---|---|---|
| 8,755,066 B2 * | 6/2014 | Shudo .................. | H04N 1/4433 358/1.14 |
| 10,768,870 B2 * | 9/2020 | Nakatani ................. | G06F 3/126 |
| 2013/0163038 A1 | 6/2013 | Oishi | |
| 2016/0216864 A1 * | 7/2016 | Miyazaki ........... | H04N 1/00941 |
| 2020/0101585 A1 * | 4/2020 | Chen .................... | B25B 23/0014 |
| 2020/0280646 A1 * | 9/2020 | Onishi .................. | G06F 3/1257 |

FOREIGN PATENT DOCUMENTS

JP 2013-131016 A 7/2013

\* cited by examiner

*Primary Examiner* — Allen H Nguyen
(74) *Attorney, Agent, or Firm* — Scully, Scott, Murphy & Presser, PC

(57) ABSTRACT

A non-transitory computer-readable medium stores computer-readable instructions executable by a processor of an information processing device communicably connected with at least one server and a plurality of devices. The instructions are configured to, when executed by the processor, cause the information processing device to obtain authentication information generated by the at least one server configured to provide a service, accept designation of the plurality of devices to be registered with the at least one server based on the authentication information and to be used for the service, and send the same authentication information as obtained to the plurality of devices designated.

10 Claims, 7 Drawing Sheets

COMPUTER-READABLE MEDIUM, REGISTRATION DEVICE, REGISTRATION SYSTEM, AND METHOD TO REDUCE WORKLOAD TO REGISTER A PLURALITY OF DEVICES

CROSS REFERENCE TO RELATED APPLICATIONS

This application claims priority under 35 U.S.C. § 119 from Japanese Patent Application No. 2021-059363 filed on Mar. 31, 2021. The entire subject matter of the application is incorporated herein by reference.

BACKGROUND

A printing system has been known that includes a group of servers, a client, and an image forming device that are interconnected via a network. In the printing system, in response to receipt of a print instruction from a user, the client sends print data of contents to the image forming device via the group of servers. Then, the image forming device performs printing based on the print data.

SUMMARY

However, in the known technology, to register an image forming device with the printing system, the user needs to operate the image forming device to be newly registered and generate registration information, and then send the generated registration information from the image forming device to a server. Therefore, when a large number of image forming devices are registered, a workload on the printing system is increased.

Aspects of the present disclosure are advantageous to provide one or more improved techniques that make it possible to reduce a workload to register a plurality of devices.

According to aspects of the present disclosure, a non-transitory computer-readable medium is provided, which stores computer-readable instructions executable by a processor of an information processing device communicably connected with at least one server and a plurality of devices. The instructions are configured to, when executed by the processor, cause the information processing device to obtain authentication information generated by the at least one server configured to provide a service. The instructions are further configured to, when executed by the processor, cause the information processing device to accept designation of the plurality of devices to be registered with the at least one server based on the authentication information and to be used for the service. The instructions are further configured to, when executed by the processor, cause the information processing device to send the same authentication information as obtained to the plurality of devices designated.

According to aspects of the present disclosure, further provided is a registration device that includes a user interface, a communication interface, and a controller. The communication interface is configured to communicably connect with at least one server and a plurality of devices. The controller is configured to obtain, via the communication interface, authentication information generated by the at least one server configured to provide a service. The controller is further configured to accept, via the user interface, designation of the plurality of devices to be registered with the at least one server based on the authentication information and to be used for the service. The controller is further configured to send, via the communication interface, the same authentication information as obtained to the plurality of devices designated.

According to aspects of the present disclosure, further provided is a registration system that includes at least one server, a plurality of devices, and a registration device. The at least one server is configured to provide a service. The plurality of devices are usable for the service. The registration device is communicably connected with the at least one server and the plurality of devices. The registration device is configured to obtain authentication information generated by the at least one server. The registration device is further configured to accept designation of the plurality of devices to be registered with the at least one server based on the authentication information. The registration device is further configured to send the same authentication information as obtained to the plurality of devices designated. Each of the plurality of devices is configured to send to the at least one server the same authentication information received from the registration device. The at least one server is configured to register the plurality of devices based on the same authentication information received from the plurality of devices.

According to aspects of the present disclosure, further provided is a method implementable on an information processing device communicably connected with at least one server and a plurality of devices. The method includes obtaining authentication information generated by the at least one server configured to provide a service. The method further includes accepting designation of the plurality of devices to be registered with the at least one server based on the authentication information and to be used for the service. The method further includes sending the same authentication information as obtained to the plurality of devices designated.

According to aspects of the present disclosure, further provided is a method implementable in a registration system including at least one server, a plurality of devices, and a registration device. The method includes obtaining, by the registration device, authentication information generated by the at least one server configured to provide a service. The method further includes accepting, by the registration device, designation of the plurality of devices to be registered with the at least one server based on the authentication information and to be used for the service. The method further includes sending the same authentication information as obtained, from the registration device to the plurality of devices designated. The method further includes sending the same authentication information received from the registration device, from each of the plurality of devices to the at least one server. The method further includes registering, by the at least one server, the plurality of devices based on the same authentication information received from the plurality of devices.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

An illustrative embodiment according to aspects of the present disclosure will be described with reference to the accompanying drawings.

[1. Overall Configuration]

Figure 1:
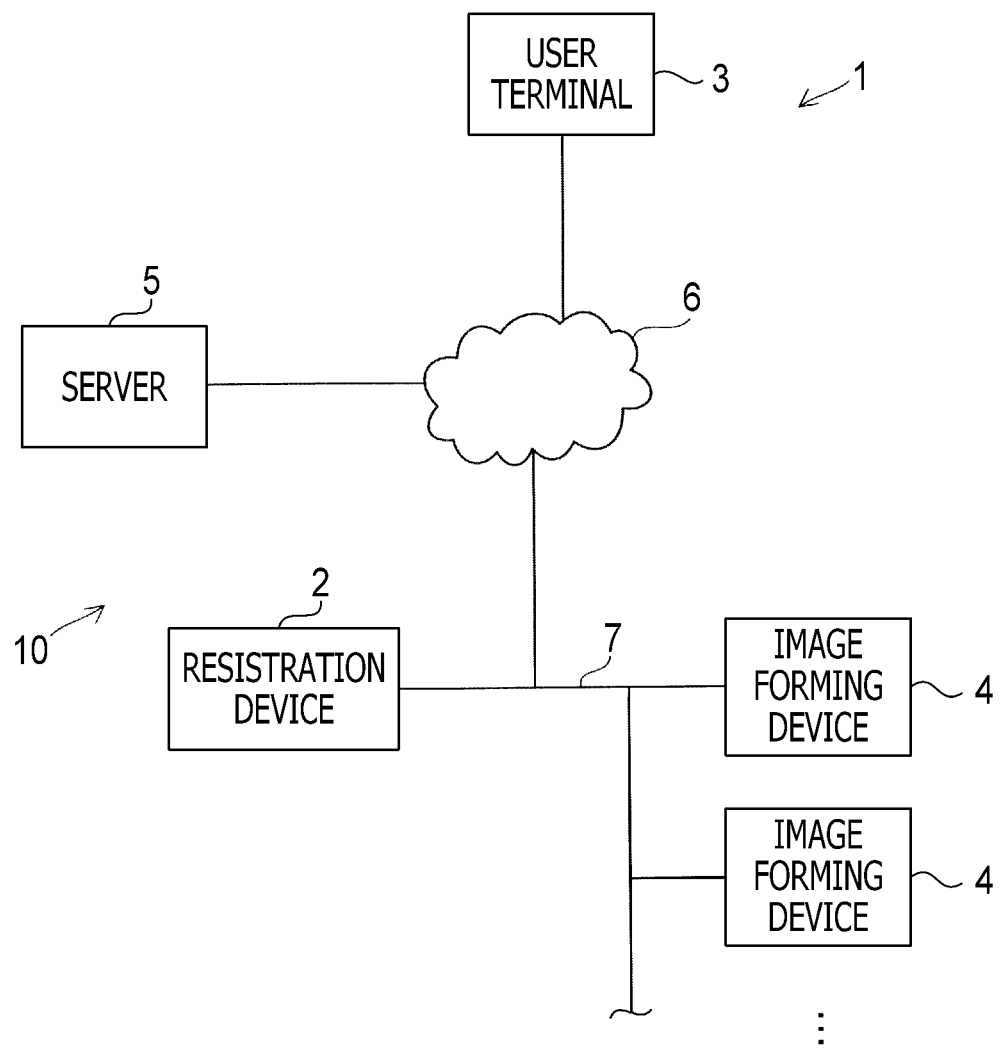
FIG. 1 is a block diagram schematically showing a configuration of a printing system.

As shown in FIG. 1, in the illustrative embodiment, a printing system 1 includes at least one registration device 2, at least one user terminal 3, a plurality of image forming devices 4, and at least one server 5. It is noted that the at least one server 5 in the illustrative embodiment may be a single server, or may be a plurality of servers that are interconnected via a network and configured to perform distributed processing. These elements included in the printing system 1 are interconnected via a wide area network 6. Examples of the wide area network 6 may include, but are not limited to, the Internet.

The elements included in the printing system 1 may be connected with the wide area network 6 via a local area network 7. FIG. 1 shows an example of the printing system 1 in which a registration device 2 and the plurality of image forming devices 4 are connected with the local area network 7, and are connected with the wide area network 6 via the local area network 7. The local area network 7 may include at least one of a wireless LAN and a wired LAN.

The printing system 1 provides a cloud service (hereinafter referred to as a "printing service") in which at least one of the image forming devices 4 performs printing based on print data generated by a user terminal 3. Namely, a main ID and a plurality of user IDs associated with the main ID may be registered in a management database of a server 5. Moreover, in the management database of the server 5, device IDs of the image forming devices 4 included in the printing system 1 is registered in association with the main ID.

After the user inputs a user ID and a password into the user terminal 3, and the user ID and the password are sent from the user terminal 3 to the server 5, the user is allowed to log on to the printing system 1. To use the printing service, the user who has logged on may request the server 5 to search for device IDs of available image forming devices 4 via the user terminal 3. In response to receipt of the request, the server 5 searches the management database for the device IDs of the image forming devices 4 that are associated with the same main ID as the user's user ID. Then, the server 5 sends the search result to the user terminal 3. On the other hand, the user terminal 3 displays the search result received from the server 5 and accepts from the user a selection of an image forming device 4 to be used for printing.

Thereafter, the user terminal 3 sends to the server 5 the print data and the device ID of the image forming device 4 selected by the user. The server 5 sends the print data to the image forming device 4 indicated by the device ID. Then, the image forming device 4, which has received the print data, perform printing based on the print data.

Namely, although the printing system 1 accepts various types of image forming devices 4 connected thereto, the user is allowed to, by using the printing service, cause one of the various types of image forming devices 4 to perform printing, even without installing any applications corresponding to the various types of image forming devices 4.

As an example of the printing service of the illustrative embodiment, Universal Print, provided by Azure ("AZURE" is a registered trademark of Microsoft Corporation) and Microsoft 365 ("MICROSOFT 365" is a registered trademark of Microsoft Corporation), has been known. The server 5 in the printing system 1 is configured to operate in substantially the same manner as a server that provides Universal Print.

As will be described in detail later, the registration device 2, the server 5, and the plurality of image forming devices 4, included in the printing system 1, are configured to serve as a registration system 10 to collectively register the image forming devices 4 with the server 5.

[2. Registration Device]

Figure 2:
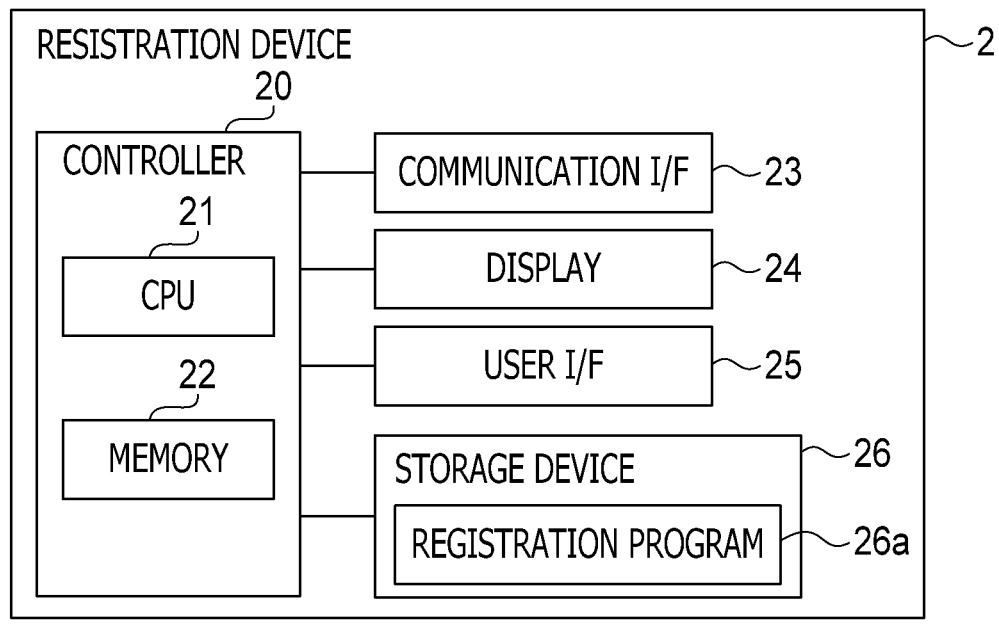
FIG. 2 shows block diagrams of a registration device and a user terminal.
Figure 2:
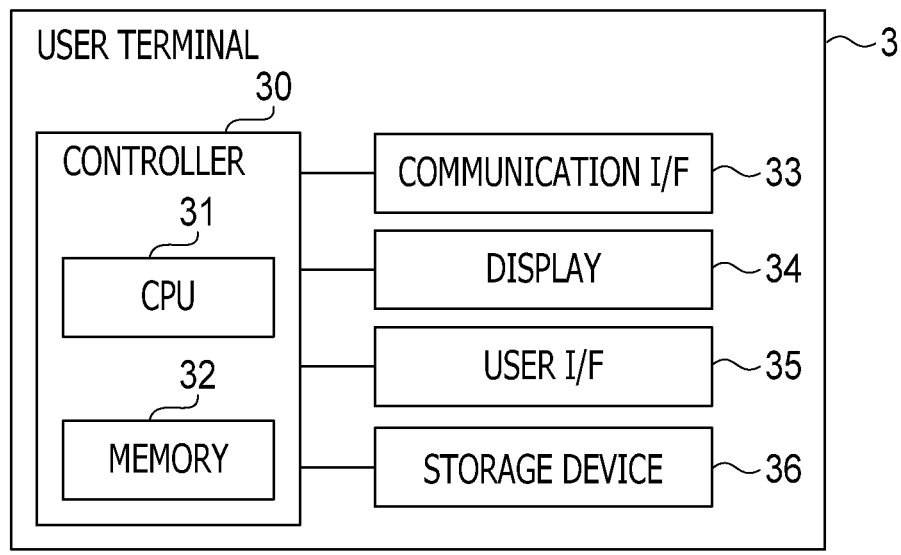

The registration device 2 is an information processing device such as a PC. As shown in FIG. 2, the registration device 2 includes a controller 20, a communication I/F ("I/F" is an abbreviation for "interface") 23, a display 24, a user I/F 25, and a storage device 26.

The controller 20 includes a CPU 21 and a memory 22. The memory 22 includes a non-transitory tangible storage medium. Specifically, the memory 22 includes a semiconductor memory such as a RAM. The memory 22 is used as a main memory. The CPU 21 is configured to operate according to one or more programs loaded in the memory 22 from, for instance, the storage device 26, thereby performing processes. In other words, below-mentioned processing mainly by the controller 20 may be realized by the CPU 21 executing the one or more programs loaded in the memory 22.

The communication I/F 23 is configured to perform communication via the network. The display 24 is configured to display images under control by the controller 20. For instance, the display 24 includes an LCD ("LCD" is an abbreviation for "Liquid Crystal Display").

The user I/F 25 is configured to receive user operations. For instance, the user I/F 25 includes a keyboard and a pointing device. The user I/F 25 generates operation information in response to acceptance of a user operation, and outputs the generated operation information to the controller 20. Then, the controller 20 performs a process according to the operation information from the user I/F 25.

The storage device 26 may include an SSD ("SSD" is an abbreviation for "Solid State Drive") and an HDD ("HDD" is an abbreviation for "Hard Disk Drive"). The storage device 26 is configured to store one or more programs and data. Specifically, for instance, the storage device 26 stores a registration program 26*a* (which will be described in detail later) for collectively registering the plurality of image forming devices 4 with the server 5. The storage device 26 storing the registration program 26*a* may be included in the controller 20.

[3. User Terminal]

The user terminal 3 is an information processing device such as a PC. As shown in FIG. 2, the user terminal 3 includes a controller 30, a communication I/F 33, a display 34, a user I/F 35, and a storage device 36. Each of the above elements included in the user terminal 3 has substantially the same configuration as a corresponding one of the elements included in the registration device 2.

[4. Image Forming Device]

Figure 3:
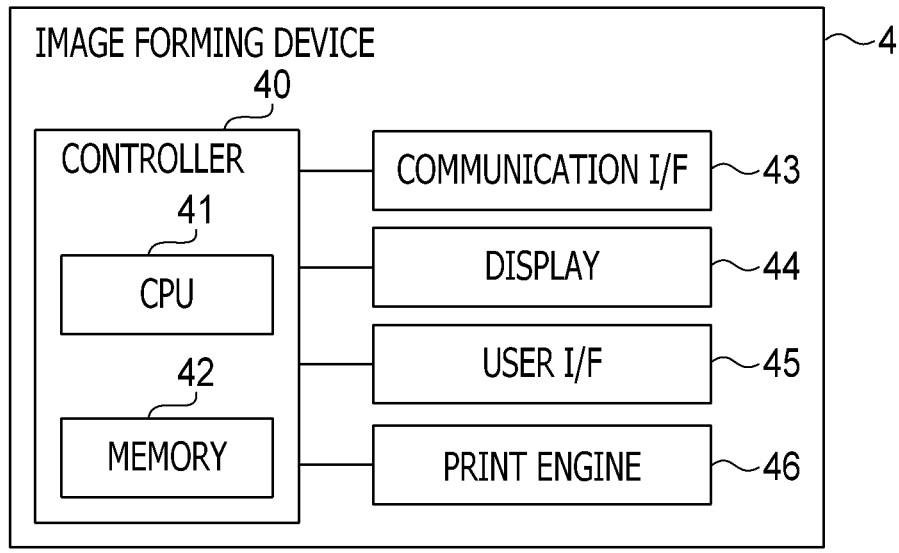
FIG. 3 shows block diagrams of each image forming device and a server.
Figure 3:
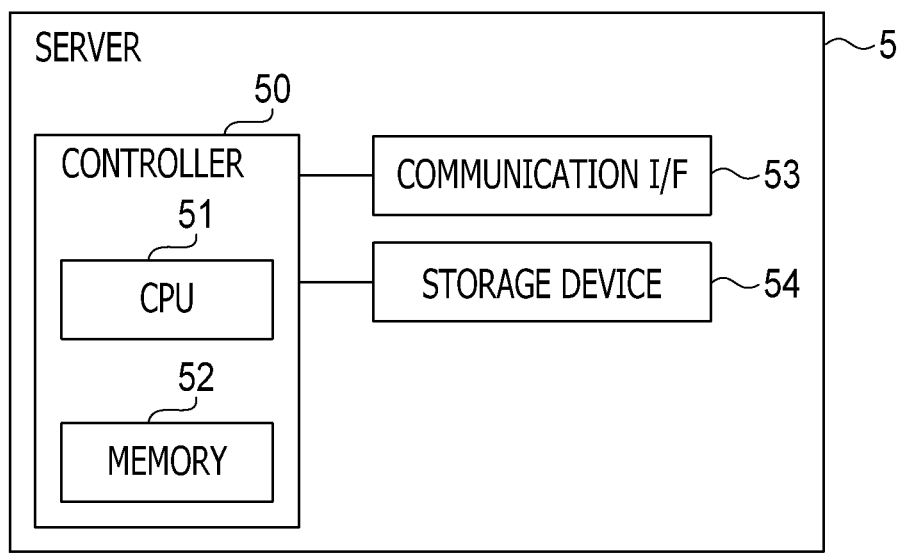

Each image forming device 4 is configured to function as a printer. As shown in FIG. 3, each image forming device 4 includes a controller 40, a communication I/F 43, a display 44, a user I/F 45, and a print engine 46. The image forming device 4 may be configured as an MFP ("MFP" is an abbreviation for "Multi-Function Peripheral") that further has a function as a scanner.

The controller 40 includes a CPU 41 and a memory 42. The memory 42 may include a RAM and a non-volatile memory such as a flash memory. The non-volatile memory may store one or more computer programs and data. The CPU 41 is configured to comprehensively control the image forming device 4 by performing processes according to the one or more computer programs stored in the memory 42.

The communication I/F 43 is configured to perform communication via the network. The display 44 is configured to display images under control by the controller 40. For instance, the display 44 includes an LCD.

The user I/F 45 is configured to receive user operations. The user I/F 45 may include a touch panel provided on the LCD of the display 44. The print engine 46 is configured to print an image on a sheet under control by the controller 40.

[5. Server]

As shown in FIG. 3, the server 5 includes a controller 50, a communication I/F 53, and a storage device 54. The controller 50 includes a CPU 51 and a memory 52. The memory 52 includes a non-transitory tangible storage medium. Specifically, the memory 52 includes a semiconductor memory such as a RAM. The memory 52 is used as a main memory. The CPU 51 is configured to operate according to one or more programs loaded in the memory 52, thereby performing processes. In other words, processing mainly by the controller 50 may be realized by the CPU 51 executing the one or more programs loaded in the memory 52.

The communication I/F 53 is configured to perform communication via the network. The storage device 54 may include an SSD and an HDD. The storage device 54 is configured to store one or more programs and data. Moreover, the storage section 54 stores the management database for the aforementioned printing service.

[6. Registration of Image Forming Devices]

As described above, the registration system 10, which includes the registration device 2 executing the registration program 26a and the server 5, is configured to collectively register the plurality of image forming devices 4 to be used for the printing service. Specifically, the registration device 2 obtains a single piece of authentication information (i.e., a token) generated by the server 5 and associated with the main ID of the printing service, and sends the obtained authentication information to the plurality of image forming devices 4. Then, each image forming device 4, which has received the authentication information, sends the authentication information to the server 5, and is registered in association with the main ID, in the management database of the server 5. Namely, the plurality of image forming devices 4 are registered with the server 5 using the same authentication information.

The same authentication information to be sent to the plurality of image forming devices 4 may include completely the same authentication information and substantially the same authentication information. For instance, a plurality of pieces of authentication information as below may be included in the same authentication information to be sent to the plurality of image forming devices 4. Specifically, the same authentication information to be sent to the plurality of image forming devices 4 may include, but is not limited to, a plurality of pieces of authentication information having a common section and an additional section. The common section of each authentication information is identical to the common section of the other authentication information. The additional section of each authentication information may be different from the additional section of the other authentication information.

Further, the same authentication information to be sent to each image forming device 4 may be data-compressed. In this case, the data compression method for the same authentication information to be sent to each image forming device 4 may be different from or identical to the data compression method(s) for the same authentication information to be sent to the other one or more image forming devices 4. Moreover, the same authentication information to be sent to each image forming device 4 may be encrypted. In this case, the encryption method for the same authentication information to be sent to each image forming device 4 may be different from or identical to the encryption method(s) for the same authentication information to be sent to the other one or more image forming devices 4.

Subsequently, a process to collectively register the plurality of image forming devices 4 with the server 5 will be described in detail.

[7. Authentication Information Obtaining Process]

Figure 4:
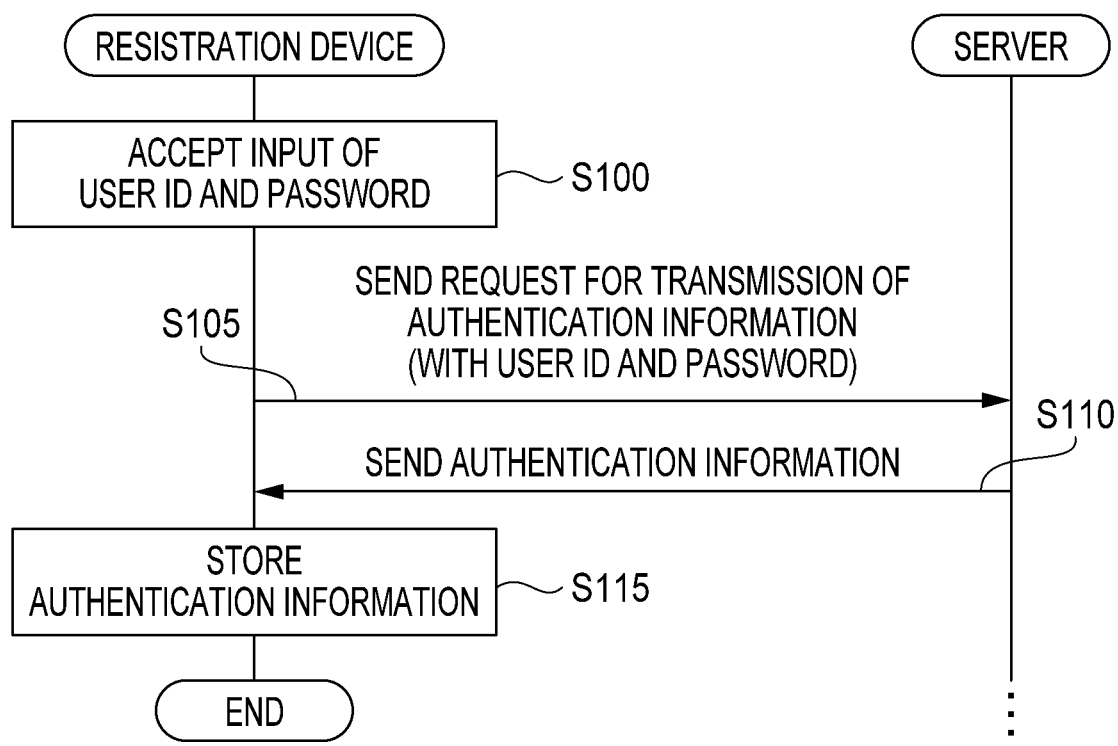
FIG. 4 is a flowchart showing a procedure of an authentication information obtaining process.

First, referring to FIG. 4, an explanation will be provided of an authentication information obtaining process to obtain, by the registration device 2, a single piece of authentication information to be used for registration of the plurality of image forming devices 4. Processing by the registration device 2 in the authentication information obtaining process is realized by the registration device 2 (more specifically, the CPU 21) executing the registration program 26a.

In S100, the controller 20 of the registration device 2 accepts the input of a user ID and a password for logging on to the printing system 1. Then, in S105, the controller 20 sends, to the server 5, a request for transmission of a single piece of authentication information together with the user ID and the password.

The controller 50 of the server 5, which has received the request for transmission of the authentication information, performs user authentication based on the user ID and the password received from the registration device 2. When the user authentication is successful, the controller 50 identifies the main ID associated with the user ID, then generates a single piece of authentication information associated with the main ID, and sends the generated authentication information to the registration device 2 (S110).

After receiving the authentication information from the server 5, the controller 20 of the registration device 2 stores the authentication information in the storage device 26 (S115). Methods for obtaining the authentication information are not limited to the above method. For instance, another information processing device may obtain the authentication information from the server 5 in the same manner. Thereafter, the controller 20 of the registration device 2 may communicate with the said another information processing device to obtain the authentication information. In another instance, a recording medium (e.g., a USB memory, an SD card ("SD" is a registered trademark of SD-3C LLC), and an optical magnetic disk) on which the authentication information obtained in the same manner is stored may be connected with the registration device 2. Then, the controller 20 may read the authentication information from the recording medium.

[8. Authentication Information Transmission Process]

Figure 5:
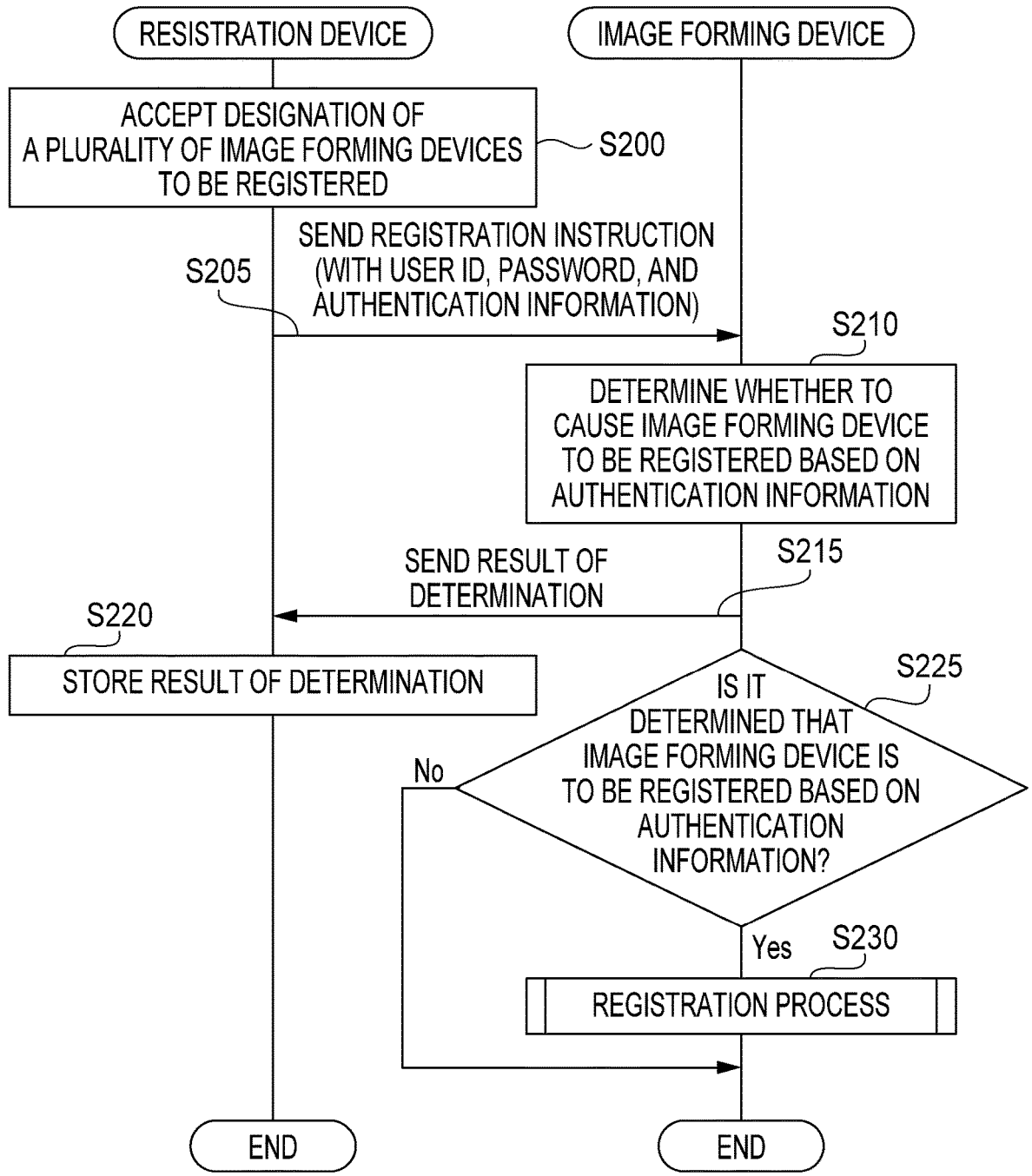
FIG. 5 is a flowchart showing a procedure of an authentication information transmission process.

Next, referring to FIG. 5, an explanation will be provided of an authentication information transmission process to transmit the same authentication information obtained in the authentication information obtaining process to a plurality of image forming devices 4 specified by the user. Processing by the registration device 2 in the authentication information transmission process is realized by the registration device 2 (more specifically, the CPU 21) executing the registration program 26a.

In S200, the controller 20 of the registration device 2 accepts, via the user I/F 25, the designation of a plurality of image forming devices 4 to be registered with the server 5. Specifically, for instance, the controller 20 may accept the input of identification information of the plurality of image forming devices 4 to be registered. Examples of the identification information of each image forming device 4 may include, but are not limited to, identification information of each image forming device 4 on the network, such as an IP address, a MAC address, an e-mail address, and a URL. Further, the examples of the identification information of each image forming device 4 may include, but are not limited to, identification information specifically assigned to each individual image forming device 4 itself, such as a serial number and a management ID of each image forming device 4. In addition to the above, for instance, the controller 20 may cause the display 24 to display a list of a plurality of unregistered image forming devices 4 and accept the selection of these image forming devices 4. In this case, the controller 20 may ascertain the identification information of the image forming devices 4 to be registered, based on the selection results.

In S205, the controller 20 of the registration device 2 sends, to each image forming device 4 specified in S200, a registration instruction to cause each image forming device 4 to be registered with the server 5. Specifically, for instance, when accepting the input of the identification information of each image forming device 4 on the network in S200, the controller 200 may send the registration instruction with the identification information as transmission destinations. In another instance, when accepting the input of the identification information assigned to each individual image forming device 4 itself in S200, the controller 200 may send the registration instruction to each transmission destination identified based on the identification information. At this time, along with the registration instruction, the controller 200 sends the user ID and the password for logging on to each image forming device 4, to each image forming device 4. Furthermore, along with the registration instruction, the controller 200 sends the same authentication information as obtained in the authentication information obtaining process, to each image forming device 4.

The controller 40 of each image forming device 4 that have received the registration instruction performs user authentication based on the received user ID and password. Then, when the user authentication is successful, the controller 40 determines whether to cause a corresponding image forming device 4 to be registered with the server 5 based on the received authentication information (S210). Specifically, the controller 40 may determine to not cause the corresponding image forming device 4 to be registered with the server 5, for instance, when a format of the authentication information is not compatible with the image forming device 4, the image forming device 4 is not compatible with printing by the printing system 1, or the user authentication is unsuccessful. Meanwhile, when none of these cases applies, the controller 40 may determine to cause the corresponding image forming device 4 to be registered with the server 5. Then, the controller 40 sends a result of the determination in S210 to the registration device 2 (S215).

In S220, the controller 20 of the registration device 2 stores into the storage device 26 the result of the determination, received from each image forming device 4, as to whether to cause each image forming device 4 to be registered with the server 5. In S225, when determining to cause the corresponding image forming device 4 to be registered with the server 5 based on the received authentication information (S225: Yes), the controller 40 performs a registration process (which will be described in detail later) for the corresponding image forming device 4 (S230). Thereafter, the controller 40 terminates the present process. Meanwhile, when determining to not cause the corresponding image forming device 4 to be registered with the server 5 (S225: No), the controller 40 terminates the present process without performing the registration process in S230.

[9. Registration Process]

Figure 6:
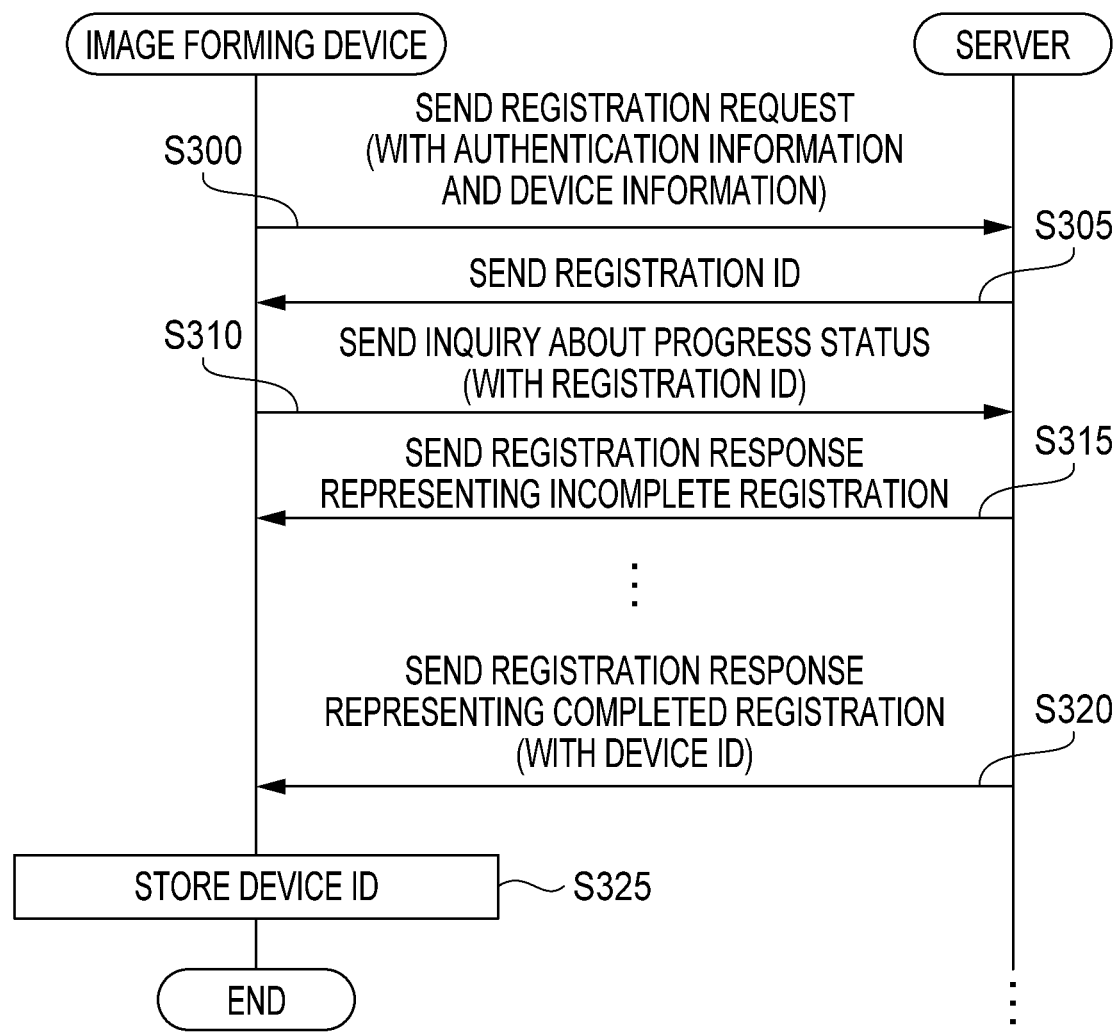
FIG. 6 is a flowchart showing a procedure of a registration process.

Next, referring to FIG. 6, an explanation will be provided of the registration process in which an individual image forming device 4 registers the image forming device 4 itself with the server 5 using the authentication information received from the registration device 2.

In S300, the controller 40 of the image forming device 4 sends to the server 5 a registration request for registration of the image forming device 4 with the server 5. At this time, the controller 40 also sends to the server 5 device information, and the authentication information received from the registration device 2 along with the registration request. For instance, the device information may include the identification information of the image forming device 4, a name given to the image forming device 4 by the user, the name of a manufacturer of the image forming device 4, and a model name of the image forming device 4.

The controller 50 of the server 5, which has received the registration request, sends a registration ID to the image forming device 4 as a sender of the registration request (S305). Then, the controller 50 starts performing an authentication process for the image forming device 4. When the authentication process is successful, a device ID is set for the image forming device 4, and is registered in association with the device information of the image forming device 4. Thereby, the image forming device 4 is registered. Meanwhile, for instance, when a validity period of the authentication information is expired, the image forming device 4 is not registered due to the unsuccessful authentication process.

Thereafter, the controller 40 of the image forming device 4, which has received the registration ID, performs polling to check a progress status of the registration process. Specifically, after receiving the registration ID, the controller 40 repeatedly sends to the server 5 an inquiry about the progress status of the registration process together with the registration ID at regular time intervals (S310).

Then, each time receiving the inquiry about the progress status, the controller 50 of the server 5 sends a registration response to the image forming device 4 as a sender of the inquiry (S315 or S320). The registration response represents whether the registration of the image forming device 4 has been completed. When sending the registration response representing the completed registration, the controller 50 sends the device ID set for the image forming device 4 together with the registration response. When having failed to register the image forming device 4, the controller 50 provides the image forming device 4 with a notification that the registration of the image forming device 4 is unsuccessful.

After receiving the device ID and the registration response representing the completed registration, the controller 40 of the image forming device 4 stores the device ID in the memory 42 (S325). Thereafter, the controller 40 terminates the registration process.

[10. Registration Checking Process]

Figure 7:
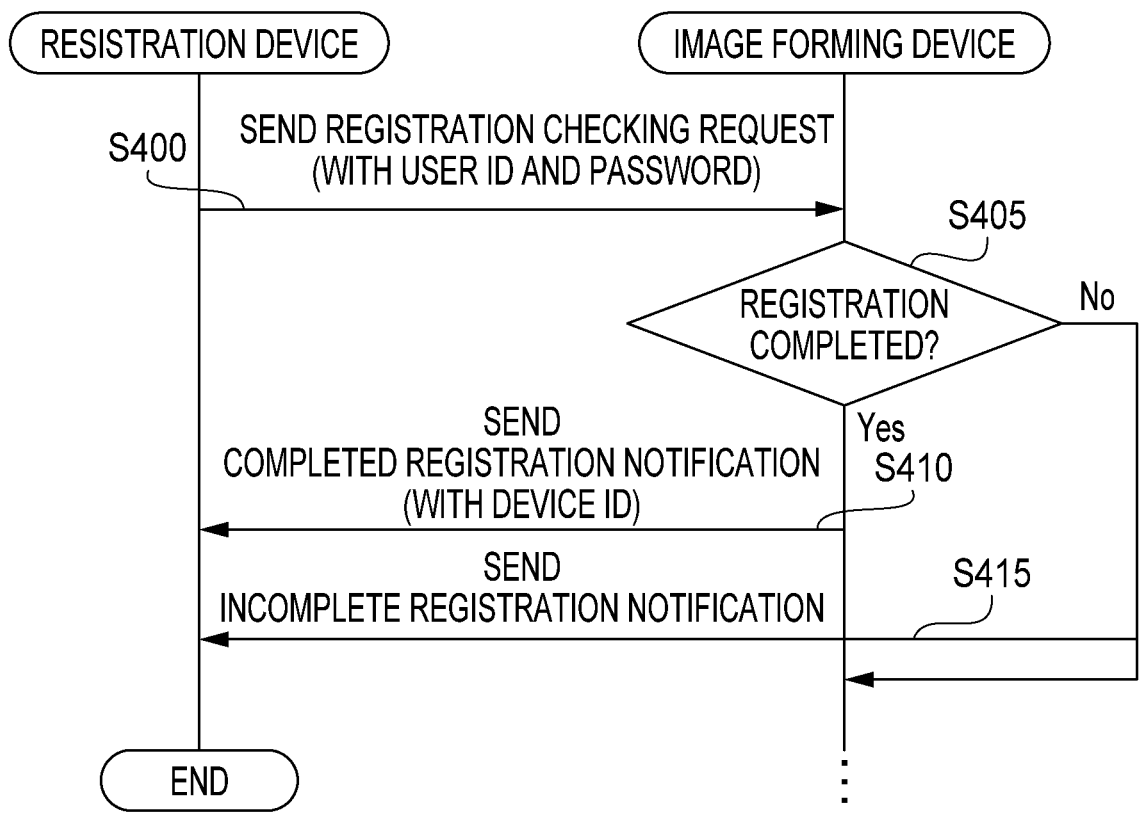
FIG. 7 is a flowchart showing a procedure of a registration checking process.

Subsequently, referring to FIG. 7, an explanation will be provided of a registration checking process in which the registration device 2 inquires of each image forming device 4 that performs the above registration process whether the registration of each image forming device 4 has been completed. Processing by the registration device 2 in the registration checking process is realized by the registration device 2 (more specifically, the CPU 21) executing the registration program 26a.

In S400, the controller 20 of the registration device 2 sends a registration checking request to all the image forming devices 4 from which the controller 20 has received the result of the determination as to whether the image forming devices 4 are to be registered with the server 5 (i.e., to all the image forming devices 4 that have performed the registration process). The registration checking request is for inquiring of each image forming device 4 about the result of the registration process to register each image forming device 4 with the server 5. In addition, the controller 20 sends, to each image forming device 4, the user ID and the password for logging on to each image forming device 4 along with the registration checking request.

The process of S400 is performed at a predetermined timing after the transmission of the registration instruction (i.e., the authentication information) to each image forming device 4 in the authentication information transmission process. Specifically, for instance, the process of S400 may be performed when a predetermined time has elapsed since the transmission of the registration instruction, or may be performed in response to receipt of a user instruction via the user interface 25.

The controller 40 of each image forming device 4, which has received the registration checking request, performs user authentication based on the user ID and the password received along with the registration checking request. Then, after the successful user authentication, the controller 40 determines whether the registration of the corresponding image forming device 4 with the server 5 has been completed (S405). Specifically, when the controller 40 has received from the server 5 the registration response representing the completed registration, the controller 40 determines that the registration of the corresponding image forming device 4 with the server 5 has been completed (S405: Yes). Then, the controller 40 sends to the registration device 2 a completed registration notification along with the device ID obtained from the server 5 (S410). The completed registration notification represents that the registration of the corresponding image forming device 4 with the server 5 has been completed. Meanwhile, when determining that the registration of the corresponding image forming device 4 with the server 5 has not been completed (S405: No), the controller 40 sends an incomplete registration notification to the registration device 2 (S410). If the controller 40 has received from the server 5 a registration response representing a failure in the registration, the controller 40 may send to the registration device 2 an incomplete registration notification representing the unsuccessful registration.

Then, in response to receipt of the complete registration notification or the incomplete registration notification, the controller 20 terminates the registration checking process.

[11. Advantageous Effects]

According to the illustrative embodiment described above, to register the plurality of image forming devices 4 with the server 5, the same authentication information is sent from the registration device 2 to each image forming device 4. Hence, there is no need to prepare individual authentication information for each image forming device 4. Accordingly, it is possible to reduce a workload to register the plurality of image forming devices 4.

Each image forming device 4, which has received the authentication information, sends to the registration device 2 the result of the determination as to whether to cause each image forming device 4 to be registered with the server 5 based on the authentication information. Therefore, it is possible to check, on the registration device 2, whether each image forming device 4 is to be registered with the server 5 based on the authentication information. Accordingly, it is easier to grasp the progress status of the registration process to register the plurality of image forming devices 4.

Further, each image forming device 4 sends the completed registration notification to the registration device 2 when the registration of each image forming device 4 with the server 5 using the authentication information has been completed. Meanwhile, each image forming device 4 sends the incomplete registration notification to the registration device 2 when the registration of each image forming device 4 with the server 5 using the authentication information has not been completed. Therefore, it is possible to check, on the registration device 2, whether the registration of each image forming device 4 with the server 5 has been completed. Accordingly, it is easier to grasp the progress status of the registration process to register the plurality of image forming devices 4.

Further, each image forming device 4, which has been registered with the server 5, sends to the registration device 2 the completed registration notification along with the device ID. Therefore, it is possible to check, on the registration device 2, the device ID of each image forming device 4 that has been registered with the server 5. Accordingly, it is easier to grasp the progress status of the registration process to register the plurality of image forming devices 4.

The processing performed by the server 5 to register the plurality of image forming devices 4 may take time. In contrast, in the aforementioned illustrative embodiment, the registration device 2 sends the registration checking request to each image forming device 4 at a predetermined timing after sending the authentication information to each image forming device 4. Therefore, the registration device 2 sends the registration checking request to each image forming device 4 with a time interval after the transmission of the authentication information from the registration device 2 to each image forming device 4. Thereby, it is possible to prevent the registration checking request from being sent by the registration device 2 to each image forming device 4 before the registration of each image forming device 4 with the server 5 has been completed. Accordingly, it is possible to reduce a communication load to register the plurality of image forming devices 4.

Hereinabove, the illustrative embodiment according to aspects of the present disclosure has been described. Aspects of the present disclosure may be practiced by employing conventional materials, methodology and equipment.

Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that aspects of the present disclosure are capable of use in various other combinations and environments and are capable of changes or modifications within the scope of the inventive concept as expressed herein. For instance, the following modifications are feasible.

[12. Other Modifications]

In the aforementioned illustrative embodiment, the printing service is provided by the printing system 1, in which the registration system 10 collectively registers the plurality of image forming devices 4 to be used for the printing service with the server 5. However, for instance, in substantially the same manner as in the aforementioned illustrative embodiment, the registration system 10 may be configured to collectively register a plurality of devices to be used for a cloud service different from the printing service, with a server providing the cloud service. Even in such a case, substantially the same advantageous effects are produced.

A plurality of functions of a single element in the aforementioned illustrative embodiment may be realized by a plurality of elements. A single function of a single element may be realized by a plurality of elements. A plurality of functions achieved by a plurality of elements may be realized by a single element. A single function achieved by a plurality of elements may be realized by a single element. Moreover, some (at least one but not all) of the elements included in the configuration of the aforementioned illustrative embodiment may be omitted.

Aspects of the present disclosure may be achieved in various forms, such as a non-transitory tangible storage medium (e.g., a semiconductor memory) storing the registration program 26a, and a method corresponding to the processing achieved by the registration device 2 or the registration system 10, in addition to the registration device 2, the registration program 26a, and the registration system 10 as described above.

The following shows examples of associations between elements exemplified in the aforementioned illustrative embodiment and modifications and elements according to aspects of the present disclosure. For instance, the registration system 10 may be an example of a "registration system" according to aspects of the present disclosure. The server 5 may be an example of "at least one server" according to aspects of the present disclosure. The image forming devices 4 may be included in "a plurality of devices" according to aspects of the present disclosure. The registration device 2 may be an example of a "registration device" according to aspects of the present disclosure, and may be an example of an "information processing device" according to aspects of the present disclosure. The user I/F 25 may be an example of a "user interface" according to aspects of the present disclosure. The communication I/F 23 may be an example of a "communication interface" according to aspects of the present disclosure. The controller 20 may be an example of a "controller" according to aspects of the present disclosure. The CPU 21 may be an example of a "processor" according to aspects of the present disclosure, and may be included in the "controller" according to aspects of the present disclosure. The storage device 26 storing the registration program 26a may be an example of a "non-transitory computer-readable medium storing computer-readable instructions" according to aspects of the present disclosure, and may be included in the "controller" according to aspects of the present disclosure. The result of the determination in S210 that is sent to the registration device 2 in S215 may be an example of a "pre-registration response" according to aspects of the present disclosure. The completed registration notification and the incomplete registration notification may be included in examples of a "post-registration response" according to aspects of the present disclosure. The device ID may be an example of "identification information" according to aspects of the present disclosure.

What is claimed is:

1. A non-transitory computer-readable medium storing computer-readable instructions executable by a processor of an information processing device communicably connected with at least one server and a plurality of devices, the instructions being configured to, when executed by the processor, cause the information processing device to:
   obtain authentication information generated by the at least one server configured to provide a service;
   accept designation of the plurality of devices to be registered with the at least one server based on the authentication information and to be used for the service; and
   send the same authentication information as obtained to the plurality of devices designated.

2. The non-transitory computer-readable medium according to claim 1,
   wherein the instructions are further configured to, when executed by the processor, cause the information processing device to receive a pre-registration response from each of the plurality of devices that have received the same authentication information, each pre-registration response representing whether a corresponding device, among the plurality of devices, is to be registered with the at least one server based on the same authentication information.

3. The non-transitory computer-readable medium according to claim 1,
   wherein the instructions are further configured to, when executed by the processor, cause the information processing device to receive a post-registration response from each of the plurality of devices that have received the same authentication information, each post-registration response representing whether a corresponding device, among the plurality of devices, has been registered with the at least one server based on the same authentication information.

4. The non-transitory computer-readable medium according to claim 3,
   wherein each post-registration response, representing that the corresponding device, among the plurality of devices, has been registered with the at least one server, contains identification information set for the corresponding device registered with the at least one server.

5. The non-transitory computer-readable medium according to claim 3,
   wherein the instructions are further configured to, when executed by the processor, cause the information processing device to send a request for transmission of the post-registration response to each of the plurality of devices, at a predetermined timing after transmission of the same authentication information to the plurality of devices.

6. A registration device comprising:
a user interface;
a communication interface configured to communicably connect with at least one server and a plurality of devices; and
a controller configured to:
   obtain, via the communication interface, authentication information generated by the at least one server configured to provide a service;
   accept, via the user interface, designation of the plurality of devices to be registered with the at least one server based on the authentication information and to be used for the service; and
   send, via the communication interface, the same authentication information as obtained to the plurality of devices designated.

7. The registration device according to claim 6, wherein the controller comprises:
a processor; and
a non-transitory computer-readable medium storing computer-readable instructions configured to, when executed by the processor, cause the controller to:
   obtain the authentication information generated by the at least one server configured to provide the service;
   accept, via the user interface, designation of the plurality of devices to be registered with the at least one server based on the authentication information and to be used for the service; and
   send the same authentication information as obtained to the plurality of devices designated.

8. A registration system comprising:
at least one server configured to provide a service;
a plurality of devices usable for the service; and
a registration device communicably connected with the at least one server and the plurality of devices, the registration device being configured to:
   obtain authentication information generated by the at least one server;
   accept designation of the plurality of devices to be registered with the at least one server based on the authentication information; and
   send the same authentication information as obtained to the plurality of devices designated,
wherein each of the plurality of devices is configured to send to the at least one server the same authentication information received from the registration device, and
wherein the at least one server is configured to register the plurality of devices based on the same authentication information received from the plurality of devices.

9. A method implementable on an information processing device communicably connected with at least one server and a plurality of devices, the method comprising:
   obtaining authentication information generated by the at least one server configured to provide a service;
   accepting designation of the plurality of devices to be registered with the at least one server based on the authentication information and to be used for the service; and
   sending the same authentication information as obtained to the plurality of devices designated.

10. A method implementable in a registration system comprising at least one server, a plurality of devices, and a registration device, the method comprising:
   obtaining, by the registration device, authentication information generated by the at least one server configured to provide a service;
   accepting, by the registration device, designation of the plurality of devices to be registered with the at least one server based on the authentication information and to be used for the service;
   sending the same authentication information as obtained, from the registration device to the plurality of devices designated;
   sending the same authentication information received from the registration device, from each of the plurality of devices to the at least one server; and
   registering, by the at least one server, the plurality of devices based on the same authentication information received from the plurality of devices.

\* \* \* \* \*